United States Patent
Arunachalam et al.

(10) Patent No.: US 12,184,516 B2
(45) Date of Patent: Dec. 31, 2024

(54) USER LIFECYCLE JOURNEY AND ASSET DATA BASED BOT SKILL SELECTION

(71) Applicant: Cisco Technology, Inc., San Jose, CA (US)

(72) Inventors: Chidambaram Arunachalam, Apex, NC (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 50 days.

(21) Appl. No.: 17/869,085

(22) Filed: Jul. 20, 2022

(65) Prior Publication Data

US 2024/0031255 A1    Jan. 25, 2024

(51) Int. Cl.
*H04L 41/5074* (2022.01)
*G06F 40/30* (2020.01)
*H04L 51/02* (2022.01)

(52) U.S. Cl.
CPC .......... *H04L 41/5074* (2013.01); *G06F 40/30* (2020.01); *H04L 51/02* (2013.01)

(58) Field of Classification Search
CPC ...... H04L 41/5074; H04L 51/02; G06F 40/30
See application file for complete search history.

(56) References Cited

U.S. PATENT DOCUMENTS

| | | | |
|---|---|---|---|
| 8,291,319 B2 | 10/2012 | Li et al. | |
| 9,092,801 B2 | 7/2015 | Chang et al. | |
| 9,165,028 B1* | 10/2015 | Christensen | G06F 16/3322 |
| 9,654,598 B1* | 5/2017 | Crawford | H04W 4/023 |
| 10,025,654 B2 | 7/2018 | Soini et al. | |
| 10,063,406 B2 | 8/2018 | Tapia et al. | |
| 10,257,241 B2 | 4/2019 | Griffin | |
| 10,733,329 B1 | 8/2020 | Ragupathy et al. | |
| 11,146,599 B1 | 10/2021 | Jackson et al. | |
| 11,157,847 B2 | 10/2021 | Abhinav et al. | |
| 2003/0217105 A1 | 11/2003 | Zircher et al. | |
| 2005/0155031 A1* | 7/2005 | Wang | G06F 9/44505 |
| | | | 717/170 |
| 2007/0226032 A1 | 9/2007 | White et al. | |
| 2012/0030289 A1 | 2/2012 | Buford et al. | |
| 2014/0219437 A1 | 8/2014 | Kannan et al. | |
| 2014/0229405 A1 | 8/2014 | Govrin et al. | |
| 2017/0286155 A1 | 10/2017 | Hosabettu et al. | |

(Continued)

OTHER PUBLICATIONS

CISCO, "TAC Connect", https://tacconnect.cisco.com, Sep. 2020, 59 pages.

(Continued)

*Primary Examiner* — Soe Hlaing
(74) *Attorney, Agent, or Firm* — Edell, Shapiro & Finnan, LLC (57) ABSTRACT

A method is provided that is performed by a computer-implemented user support bot. The method includes obtaining from a user a support request related to software and/or hardware used, or to be used, by the user; obtaining user lifecycle journey information that tracks deployment, adoption and/or use by the user of the software and/or hardware; determining a user intent for the support request based on the user lifecycle journey information when there is ambiguity as to the user intent based solely on the support request; and providing a response to the support request based on the user intent.

20 Claims, 6 Drawing Sheets

(56) References Cited

U.S. PATENT DOCUMENTS

| | | | |
|---|---|---|---|
| 2017/0366479 A1 | 12/2017 | Ladha et al. | |
| 2018/0109526 A1 | 4/2018 | Fung et al. | |
| 2018/0322403 A1 | 11/2018 | Ron et al. | |
| 2019/0044829 A1 | 2/2019 | Balzer et al. | |
| 2019/0236204 A1* | 8/2019 | Canim | G10L 15/1815 |
| 2019/0268387 A1 | 8/2019 | Pelton et al. | |
| 2019/0297039 A1 | 9/2019 | Rodriguez et al. | |
| 2019/0303218 A1 | 10/2019 | Kantor et al. | |
| 2020/0007474 A1 | 1/2020 | Zhang et al. | |
| 2020/0012954 A1 | 1/2020 | Botea et al. | |
| 2020/0065218 A1* | 2/2020 | Bhosale | G06F 11/366 |
| 2020/0134211 A1 | 4/2020 | Miller et al. | |
| 2020/0151583 A1 | 5/2020 | Mueller et al. | |
| 2020/0348960 A1 | 11/2020 | Krishnamurthy et al. | |
| 2020/0364724 A1 | 11/2020 | Pulugurtha et al. | |
| 2021/0036973 A1 | 2/2021 | Venkateshwaran | |
| 2021/0125190 A1 | 4/2021 | Coman et al. | |
| 2021/0173682 A1* | 6/2021 | Chakraborti | G06N 5/043 |
| 2021/0173718 A1 | 6/2021 | Patel et al. | |
| 2021/0201901 A1 | 7/2021 | Cheng et al. | |
| 2021/0250444 A1 | 8/2021 | Piaggio et al. | |
| 2021/0409352 A1 | 12/2021 | Arunachalam et al. | |
| 2022/0165262 A1* | 5/2022 | Sumpter | G06Q 10/0631 |
| 2022/0200855 A1* | 6/2022 | Celichowski | H04L 41/5054 |

OTHER PUBLICATIONS

Ferraro, Giovanna et al., "Organizing Collaboration in Inter-organizational Innovation Networks, from Orchestration to Choreography", DOI: 10.5772/61802, Oct. 20, 2015, 14 pages.

Rucker, Bernd, "Why service collaboration needs choreography and orchestration", Apr. 13, 2017, 6 pages.

Global Relay Communications Inc., "Global Relay Information Governance Model", https://globalrelay.com/solution/information-governance, downloaded Sep. 28, 2020, 4 pages.

Smooch Technologies ULC, "Integrate and orchestrate multiple systems in the conversation stream", https://smooch.io/orchestrator/, downloaded Sep. 28, 2020, 8 pages.

Nambisan, Satish et al., "Orchestration Processes in Network-Centric Innovation: Evidence From the Field", Aug. 2011, 19 pages.

Slagter, et al., "Service Orchestration for Collaboration Patterns," CTIT Technical Report Series, Centre for Telematics and Information Technology, University of Twente, Dec. 2005, 35 pages.

Yu Chen, et al., "GraphFlow: Exploiting Conversation Flow with Graph Neural Networks for Conversational Machine Comprehension," Proceedings of the Twenty-Ninth International Joint Conference on Artificial Intelligence, Jul. 31, 2019, 7 pages.

Will Thiel, et al., "The Role of AI in Customer Experience," Pointillist by Genesys, https://www.pointillist.com/blog/role-of-ai-in-customer experience, May 26, 2020, 25 pages.

"CX Cloud" Cisco, Customer Experience, https://www.cisco.com/c/m/en_us/customer-experience/cx-cloud.html, retrieved Jun. 22, 2022, 10 pages.

Editorial Team, "The Current State and Future of AI for Customer Service," Inside Big Data, https://insidebigdata.com/2022/04/18/the-current-state-and-future-of-ai-for-customer-service/, Apr. 18, 2022, 4 pages.

Jeremy Wohlwend, et al., "Metric Learning for Dynamic Text Classification," Proceedings of the 2nd Workshop on Deep Learning Approaches for Low-Resource NLP (DeepLo 2019), pp. 143-152, Nov. 2019.

* cited by examiner

USER LIFECYCLE JOURNEY AND ASSET DATA BASED BOT SKILL SELECTION

TECHNICAL FIELD

The present disclosure relates to user support bots that provide technical assistance to users.

BACKGROUND

Most user support bots today are designed and coded to detect a user's problem/question and then look for the best answer to that problem/question to provide that answer. However, important in that initial diagnosis is the ability for the bot to understand the 'intent' or meaning of the user's problem/question. This can be particularly challenging because the English language, for example, uses the same words that can have different meanings depending on the context.

DESCRIPTION OF EXAMPLE EMBODIMENTS

Overview

In one embodiment, a method is provided that is performed by a computer-implemented user support bot. The method includes obtaining from a user a support request related to software and/or hardware used, or to be used, by the user; obtaining user lifecycle journey information that tracks deployment, adoption and/or use by the user of the software and/or hardware; determining a user intent for the support request based on the user lifecycle journey information when there is ambiguity as to the user intent based solely on the support request; and providing a response to the support request based on the user intent.

EXAMPLE EMBODIMENTS

When an organization purchases hardware or licenses software, users in the organization have to deploy and adopt it. The vendors of that hardware or software want to make sure the organization is adopting it everywhere and getting the value of it, so that the organization is inclined to renew licenses, upgrade, etc. For simplicity, the term "user" is meant to refer to an organization or entity (large and small companies, businesses, government agencies, etc.) and also to individual users within an organization.

Computing/networking equipment and software providers leverage user support bots to provide technical assistance to the users of the computing/network equipment and software. One recent development in the user support and experience space is a user support/success portal that tracks progress through stages of a user's deployment and adoption of technology (software and hardware). At each point or stage in the user lifecycle journey, there is data that indicates where the user is in the lifecycle journey for that given technology. For example, for enterprise networking equipment and software, there may be different stages and different data elements that indicate where a user is in a given stage.

Techniques are presented herein to employ user lifecycle journey information and all the components that make up where the user is at that stage or stop, for purposes of enabling a support bot to accurately respond to a support request/query. Based on where the user is in the lifecycle journey for a particular technology, the data elements around that stage can be used to more precisely determine the user's intent for a particular request/query and therefore determine how to respond to the request. The same question can mean multiple different things depending on where the user is in the lifecycle journey, the particular technology the user is inquiring about, etc. In addition, there may be situations where the lifecycle journey can inform as to what specific data should be pulled from a device or piece of equipment to fully determine the state of that device or equipment in order to properly answer the user's question.

The user lifecycle journey and its related information represent the lifecycle of the entire process of acquiring, adopting and using technology (data center or other software and/or hardware) from Need, Evaluate, Select, Purchase, Onboard, Implement, Use, Engage, Adopt, Renew, Recommend, Advocate, etc. The user lifecycle journey can be used to push users along a path to ensure that the user fully realizes the value and benefits from the technology.

As described herein, the user lifecycle journey information is used to determine which skill bundle to answer the user's support request. This involves determining where the user is in the lifecycle journey (for a given technology) to select the right skill bundle, together with other relevant information.

Figure 1:
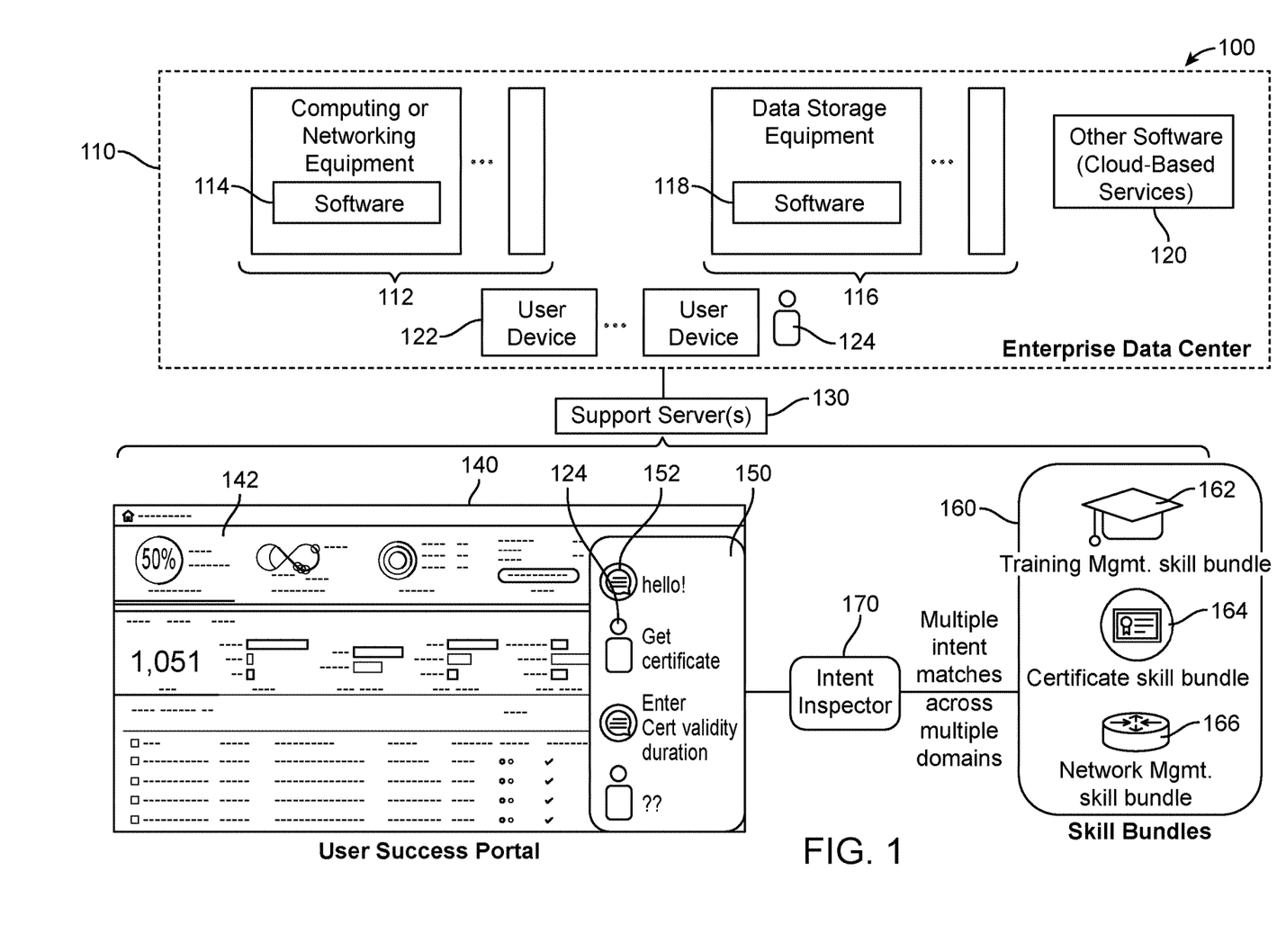
FIG. 1 is a block diagram of a computing environment in which user intent of a support request provided to a support bot is determined based on user lifecycle journey information, according to an example embodiment.

Reference is now made with respect to FIG. 1. FIG. 1 shows a block diagram of a system 100 that includes an enterprise data center 110. The enterprise data center 110 is a computing environment that may include various computing, networking and/or data storage technologies that an enterprise may license and/or purchase from one or more vendors. The enterprise may be a small business, large business or corporation, government agency, etc.

The enterprise data center 110 may include equipment and software that is co-located or distributed geographically and/or is cloud-based. For example, the enterprise data center 110 may include computing or networking equipment 112 which may execute associated computing or networking software 114, data storage equipment 116 which may execute associated data storage software 118, and other software 120 (such as various cloud-based software applications/services). The enterprise data center 110 may also include user devices 122.

Non-exhaustive examples of computing or networking equipment 112 may include web servers, application servers, routers, switches, wireless routers/access points, load balancers, firewalls, networking intrusion prevention devices, gateways, etc. Similarly, data storage equipment 116 may include data storage devices. User devices 122 may include desktop computers, laptop computers, Smartphones, tablets, desktop phones, video conference endpoints, etc. In addition, FIG. 1 shows that a user 124, such as a system administrator for the enterprise data center 110, may by a user associated with one of the user devices 122. The user 124 is referred to again here in connection with tracking interactions the user 124 makes on behalf of the enterprise data center 110. A user may be more generally referred to any user (end user or administrator user) of, or on behalf of, the enterprise data center 110.

One or more vendors of the technologies used in the enterprise data center 110 may deploy and maintain support servers 130 that are configured to communicate with the enterprise data center 110 in order to track how the enterprise is deploying and adopting the computing, networking and/or data storage technologies that the enterprise has purchased or licensed. The one or more support servers 130 may be configured to serve a user success portal 140. The user success portal 140 provides information to help users adopt the complex technology running in the enterprise data center 110. The user success portal 140 may include one or more pages and user interface screens 142 that present information about the operational state of the technologies in the enterprise data center 110, as well as where in the lifecycle journey the enterprise is for the technologies. The deployment lifecycle may be represented by a graphical image akin to a racetrack, in which a location/stop/point along the racetrack indicates a particular stage in the deployment lifecycle for a particular technology, as will be described in more detail below.

The user success portal 140 may have one or more bots with which a user may interact, through text or voice audio input, to obtain technical support and answers to various questions or queries. FIG. 1 shows an exchange 150 between a bot 152 and user 124. The bot 152 is trained with various skills from across the different technologies—along with the ability to help on general questions. Each of these knowledge sets may be isolated into what is called a skill bundle. For example, FIG. 1 shows a skill bundles library 160 with which the bot 152 is trained, where the skill bundle library 160 includes a training management skill bundle 162, a certificate skill bundle 164 and a network management skill bundle 166.

As the user 124 starts to interact with the bot 152, the user's request or query is evaluated by an intent inspector function 170 of the bot 152 to direct the query to a particular skill bundle in the skill bundles library 160 that is trained to handle questions for that technology/capability.

Challenges arise when the bot 152 does not have enough context (from the user's request) to be able to determine which skill bundle should be used to answer the question. This may cause a poor user experience because the bot would need to ask the user to clarify by asking a series of questions of the user. Sometimes the series of questions are not relevant to the user's real question, or they can cause unnecessary delays in the user getting an answer to his/her real question.

For example, if a user is asking about how they can get a certificate, this can have a number of different meanings, each with a different solution.

1. Is the user asking how they can get the certificate for the professional training exam they passed?
2. Is the user asking how they can obtain an X.509 certificate for a device?
3. Is the user asking how to get a customs certificate to release a Return Merchandise Authorization (RMA) from the local authorities?

Each of these issues are related to getting a certificate, but all involve an additional context to determine which specific issue the user is attempting to solve. Today, the solution to this ambiguity problem is to have the bot ask a series of questions, including:

Q: Are you needing to get a certificate for a professional exam you passed?
Q: Are you asking about certificates you want to install on your device?
Q: Are you asking about a certificate for a class you passed?
Q: Are you asking about a certificate bundle for server validation?

The user iterates through the various options. Obviously, this is annoying and time consuming for the user, and does not make for a good user experience.

Other examples may include questions such as:
Q: Can I talk to an agent?
Without additional context, it is unclear how to direct the user: to a licensing agent, to an online meeting service agent, or to a Technical Assistance Center (TAC) frontline agent.
Q: Please cancel my account.
Without context it is unclear if the user is referring to their Smart Licensing Virtual account, their online meeting service account, technical support account, etc.
Q: I need an RMA.
Without additional data, it is not clear for which device the user is requesting an RMA, nor what is causing the user to request the RMA.

Figure 2:
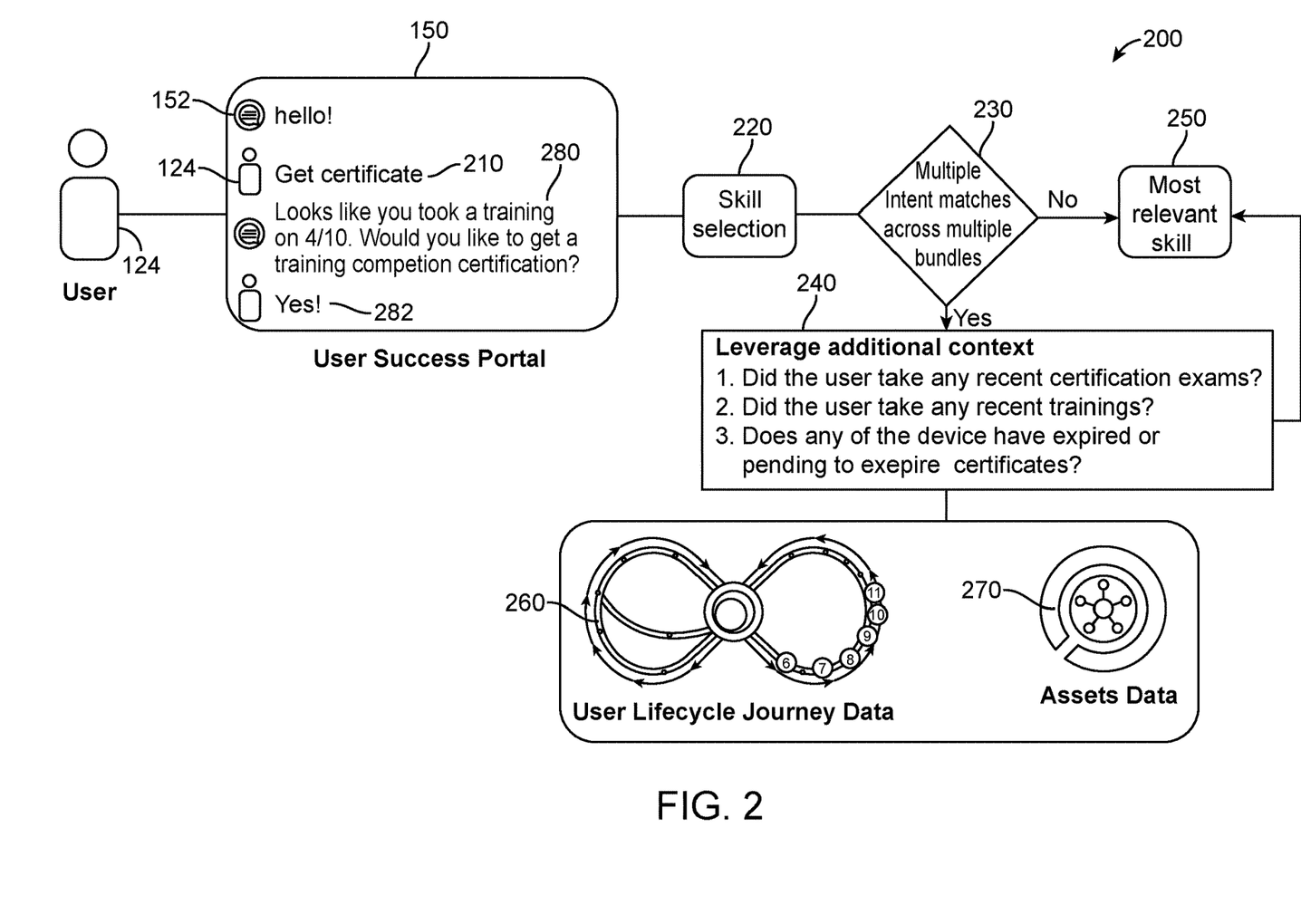
FIG. 2 is a diagram depicting a process for selecting an appropriate bot skill bundle to respond to a support request from a user based on user lifecycle journey information, according to an example embodiment.

Reference is now made to FIG. 2, for a description of a process 200 used in the system of FIG. 1 to deal with situations when there is ambiguity as to the specific intent of a request/query from a user. In the example of FIG. 2, the user 124 is interacting with the user success portal and is engaged in a conversation/exchange 150 with the bot 152. At 210, the user submits the query or request: "Get certificate." At step 220, the bot software logic that supports the bot performs a skill bundle selection based on the user's query at 210. At step 230, the bot software logic determines if there are multiple intent matches across multiple skill bundle. That is, a determination is made in step 230 if there is ambiguity as to what the user means be "Get certificate". If there is ambiguity, which is the case in this example, then the process proceeds to step 240. If there is no ambiguity, then the bot software logic, at step 250, selects the most relevant skill bundle to answer the user's query without any further processing.

When multiple matches across the skill bundles are detected at step 230, the bot software logic looks for additional context from the user lifecycle journey data 260 in order to derive intent of the user's query. The user lifecycle journey data 260 is infused with information about both the user's own journey as well as the state of deployment of technologies in the enterprise data center. The bot software logic can use this data to help inform user intent. Additionally, the bot software logic may evaluate assets data 270 which comprises metadata from the one or more devices of software within the specific lifecycle the user is looking at to examine their current state, what issues are currently impacting those one or more devices or software, and any recent changes applied to them. The assets data 270 may include information identifying one or more specific devices, the state of various specific devices or software including network topologies, software upgrades, recent configuration changes made to those devices or software, which devices that are generating various alerts in the customer's network, etc. This additional data provides context and helps the bot to determine the underlying intent behind the question the user asked and therefore to access the correct skill bundle thereby providing the user with the correct answer to their question.

In the example presented above, the bot 152 determines, from the user lifecycle journey data 260 that the user had recently taken a training session. More specifically, at step 240, the bot software logic evaluates the user lifecycle journey data 260 to determine whether the user recently took some certification exams, and whether the user recently had some training. In addition, at step 240, the bot software logic determines, based on the assets data 270, whether any devices in the enterprise data center 110 have an expired or soon to expire certificate. Based on the determination made in step 240, the bot, at 280, may ask the user 124 a further question, such as "Looks like you took a training on 4/10. Would you like to get a training completion certification?". At 282, the user provides confirmation. At this point, the bot knows specifically what the user is inquiring about, and can provide the user with the requested training completion certificate.

Figure 3A:
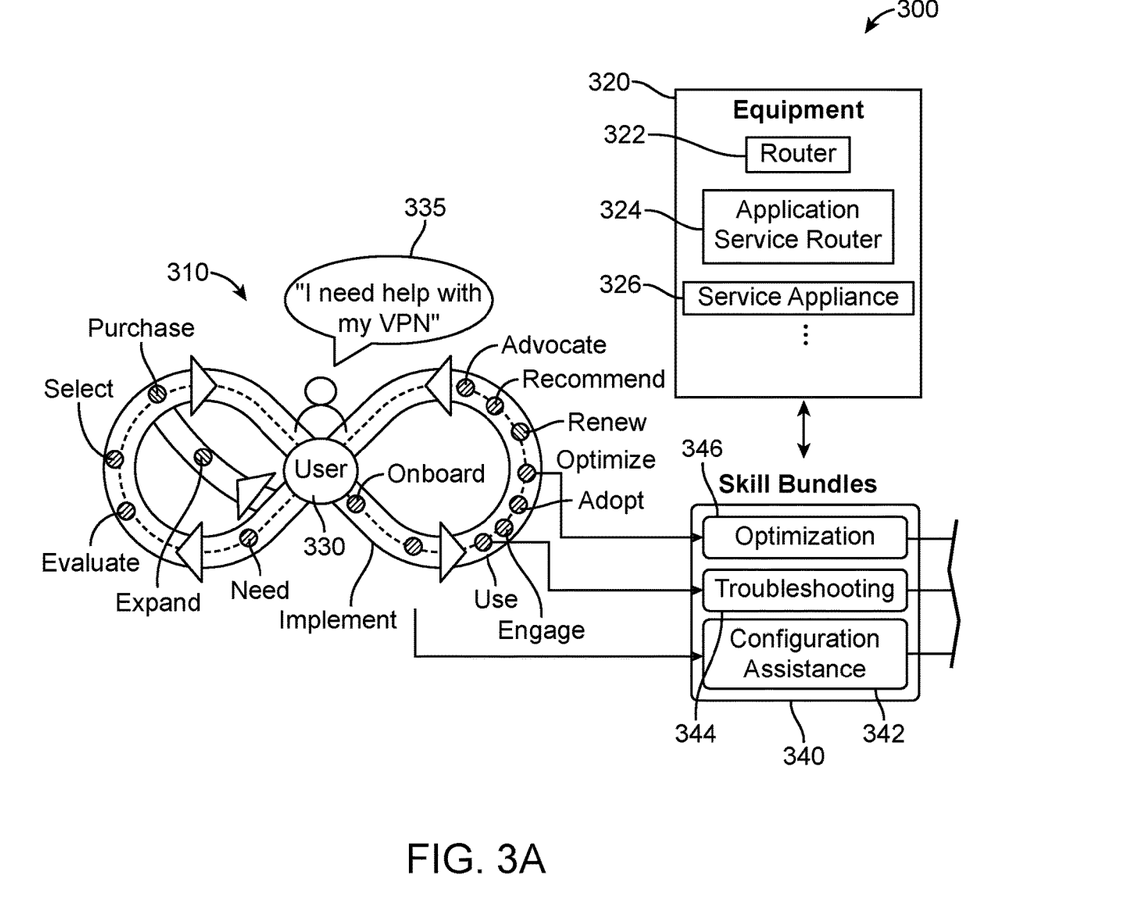
FIGS. 3A and 3B depict a process for selecting an appropriate bot skill bundle based on a particular stage of a user lifecycle journey of the technology, according to an example embodiment.
Figure 3B:
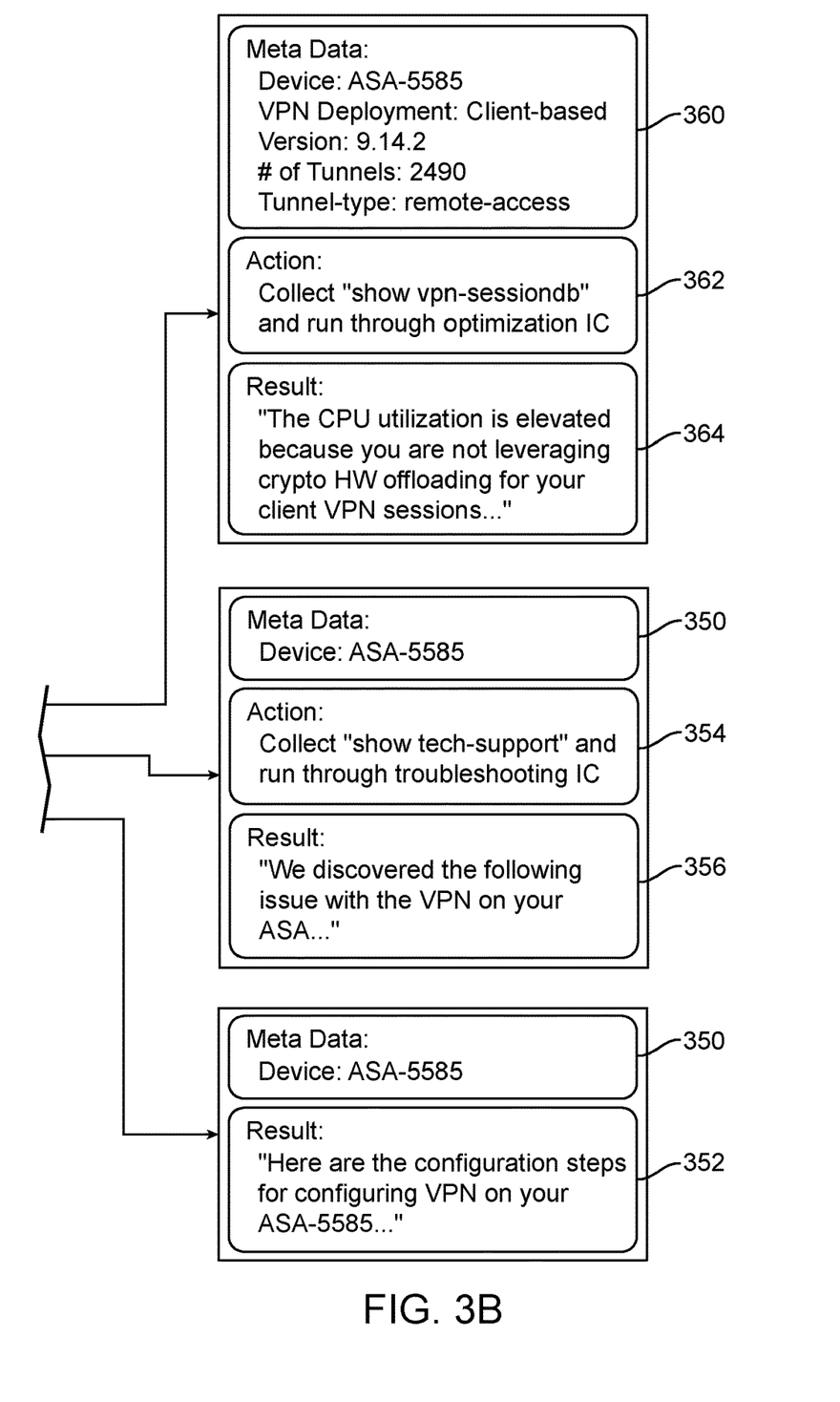

Reference is now made to FIGS. 3A and 3B for another example of the techniques presented herein. Reference is also made to FIG. 1 for purposes of this description of FIGS. 3A and 3B. FIGS. 3A and 3B show a flow for a process 300 that references data associated with stages of a user lifecycle journey for one or more technologies. To this end, FIG. 3A shows a graphical element representing a racetrack 310 that has a plurality of stages of a user lifecycle journey for one or more technologies or equipment 320, such as a router 322, an application service router (ASR) 324, and a service appliance 326. In one example, the stages include a Need stage, an Evaluate stage, a Select stage, a Purchase stage, an optional Expand stage, an Onboard stage, an Implement stage, a Use stage, an Engage stage, an Adopt Stage, an Optimize stage, a Renew stage, a Recommend stage and an Advocate stage. These are merely examples of stages, and fewer or more stages may be desirable.

The Need stage involves a user determining that there is a need for some technology (equipment and/or software) and the user evaluates this need during the Evaluate stage to determine the best fit of a particular technology (equipment and/or software). The user selects the particular technology at Select stage, and then purchases the technology at Purchase stage. The Purchase stage may include purchasing one or more licenses for using software. A user may decide to expand existing/previously acquired technology during the Expand stage.

Next, at the Onboard stage, the user installs (physically or virtually) the acquired technology, and can begin to implement the technology in the user's system (enterprise data center) during the Implement stage. During the Implement stage, the user is working on building the configuration(s) to successfully deploy the technology.

The user can then use the technology, once implemented, during the Use stage. During the Engage stage the user may be interacting with the user success portal to learn more about the capabilities of the technology, and during the Adopt stage the user may be using additional capabilities of the technology. During the Optimize stage, the user is adjusting configurations to make the best of the various capabilities of the technology. During the Renew stage, the user may renew one or more licenses and/or service/support agreements associated with the technology.

The support server(s) 130 keep track of which stage a user is in for each piece of technology through user interactions with the user success portal 140 and/or via telemetry and other status updates and communications between the support server(s) 130 and the equipment and/or software in the enterprise data center 110 (as shown in FIG. 1).

The user 330 may submit a request 335 to a support bot, where the request 335 is, in this example, "I need help with my VPN". The support bot interprets the request 335 using a skill bundle. In this example, there are several skill bundles shown at reference numeral 340: a Configuration Assistance skill bundle 342, a Troubleshooting skill bundle 344 and an Optimization skill bundle 346. The request 335 is sufficiently ambiguous to not allow the support bot to determine precisely what the request is about, and thus, which skill bundle to use to answer the request. Therefore, the support bot needs to determine in which user lifecycle stage the user is in, for a given technology. In addition, the support bot may obtain metadata from various pieces of equipment 320, e.g., for the router 322, application service router 324 and service appliance 326, to assist in answering the request.

For example, if the user is in the Implement stage for a given technology, then the user is working on building the configuration necessary to successfully deploy the functionality. With this information, the support bot would send the text of the request 335 to the Configuration Assistance skill bundle 342 to answer the request. Additionally, the support bot can pull device metadata 350 indicating which specific device it is (router 322, application service router 324 service appliance 326, etc.) and add that metadata to enhance the user's request so it can return the correct configuration instructions 352 for configuring VPNs on the specific device.

If the user is in the Use stage for the technology, then the support bot knows that the technology is already deployed, and sends the request 335 to the Troubleshooting skill bundle 344 to answer the request. Additionally, the support bot may cause an action 354 to be performed on the device, e.g., run diagnostic Intellectual Capital (IC) best practices and operational strategies against the device's configuration and operational state (e.g., a "show tech-support" command to the device) to determine if there are any issues related to a VPN on that device, and leverage that result in the response. The support bot may determine that the appropriate response 356 is to inform the user that an issue was found with the VPN on the specific device.

As another example, if the user is in the Optimize phase for the given piece of technology, the support bot knows the capability deployed on the given device, and that it has been working reliability. The support bot would send the request 335 to the Optimization skill bundle 346 and leverage the metadata 360 of the device (device type, VPN deployment, version, number of tunnels, tunnel-type, etc.) to take an action 362 to send a "show vpn-sessionsdb" command to the device and use optimization rules which would reveal parameters like selecting the best encryption and hashing algorithm for best security and lowest device resource overhead; client load-balancing; Datagram Transport Layer Security (DTLS) optimizations; hardware off-loading; etc. In one example, an application programming interface (API) request may be sent to the software and/or hardware to obtain, in response to the API request, information about a state of the software and/or hardware. The response 364 to the user may then indicate that the central processor unit (CPU) utilization on the device is elevated because hardware offloading is not leveraged for client VPN sessions.

Figure 4:
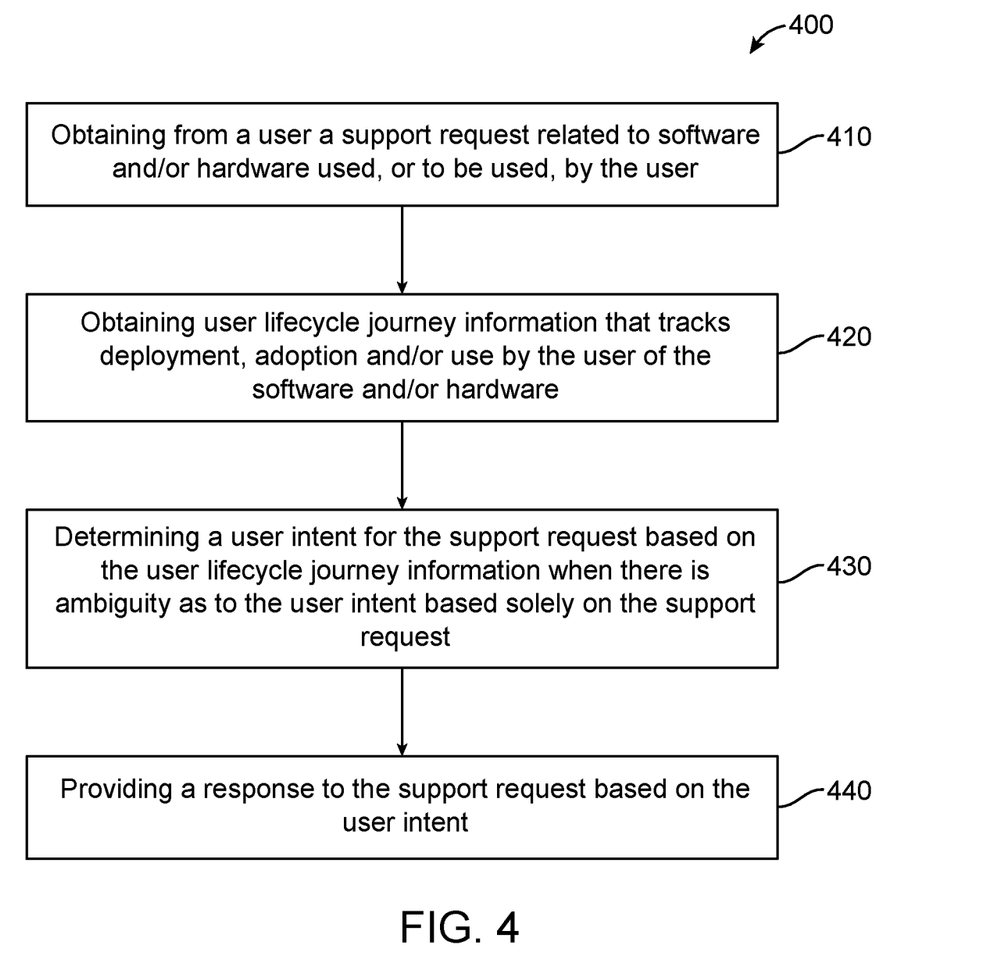
FIG. 4 is a flow chart depicting a method for determining user intent of a support request based on user lifecycle journey information, according to an example embodiment.

Reference is now made to FIG. 4. FIG. 4 shows a flow chart for a method 400 according to an example embodiment. The method 400 is a method that may be performed by a computer-implemented user support bot. At step 410, the method 400 includes obtaining from a user, a support request related to software and/or hardware used, or to be used, by the user. The support request may be entered via text (e.g., via a chat interface), voice audio, etc., via any suitable user interface to a user support bot. The user support bot may analyze the user request by text-based analysis of text of the user request, to interpret the user request regardless of how the support request is provided by the user. Thus, there may be voice-to-text conversion performed if the support request is provided by voice audio of the user.

At step 420, the method 400 includes obtaining user lifecycle journey information that tracks deployment, adoption and/or use by the user of the software and/or hardware. In one example, the user lifecycle journey information indicates which particular stage, of a plurality of stages, of a given software and/or hardware. The user lifecycle journey information may include information associated with user interactions via a user support portal, including any online training sessions performed by the user.

At step 430, the method 400 includes determining a user intent for the support request based on the user lifecycle journey information when there is ambiguity as to the user intent based solely on the support request. In one form, step 430 includes selecting from a plurality of bot skill bundles, a particular bot skill bundle to answer the support request based on the particular stage of the given software and/or hardware. In other words, the particular stage of the user lifecycle journey for a given piece of software or hardware may be used to determine which bot skill bundle should be used to answer the support request.

At step 440, the method 400 comprises providing a response to the support request based on the user intent. The response may be provided in the form of a textual response, or if desired, the text may be converted to voice audio. The response could also include playing a short video clip natively, showing a picture/screenshot, making a file available for download, etc.

In one form, the method 400 may further include the step of obtaining from the software and/or hardware, metadata identifying the software and/or hardware, state including network topology, software upgrade, configurations recently made, and/or alerts made by the software and/or hardware, and the step 430 of determining the user intent may be further based on the metadata. A command or API request may be sent to the software and/or hardware to obtain, in response to the command or API request, information about a state of the software and/or hardware.

The method 400 may further include the step of, based on the response, performing a configuration change on the software and/or hardware via a remote communication interaction from a support server, again via a command or API communication.

In summary, the techniques presented herein involve using user lifecycle journey data related to deployment, adoption and use of technologies (hardware and/or software) as well as data obtained directly from the hardware or software, to determine a user's real intent when a question/query is presented to a user support bot. In so doing, these techniques leverage contextual information about the user's technology lifecycle journey and where the user is in the lifecycle journey in order to augment the questions the user is asking the support bot. When multiple matches across the skill bundles are detected, the system goes back and looks at the user's lifecycle journey to derive intent. Again, these techniques provide a method for a bot to understand a user's intent by leveraging a user's lifecycle journey along with data and insights derived from the technology deployed in the enterprise data center, and relevant to that lifecycle and technology, to then provide the context needed to allow a bot to determine the correct response to provide to a user.

The techniques presented herein leverage the user's journey along a technology deployment lifecycle to derive intent when a support bot is unable to uniquely/unambiguously determine the user's intent based solely on the textual information of the support request. The method pulls in various data sources related to the user's data center (devices, software, topology) and associated information (IC rules (best practices and operational strategies) and their priorities; software upgrades; devices that are issuing alerts; etc.) in order to match to the user's intent. This involves tracking the user's lifecycle journey through a user support portal to understand what the user has been looking at prior to contacting the bot in order to derive user's real intent. The user lifecycle journey information may include insights from other "clouds" that to which the user may be subscribed.

By having access to the user's training plans/sessions in a current stage/stop of the user lifecycle journey, the support server knows what trainings the user has completed, what certifications they have taken recently, etc. Moreover, through the connected devices, the support server can determine whether there are certificates that have recently expired, such as an alert that the system detected a certificate that just expired on this device.

Figure 5:
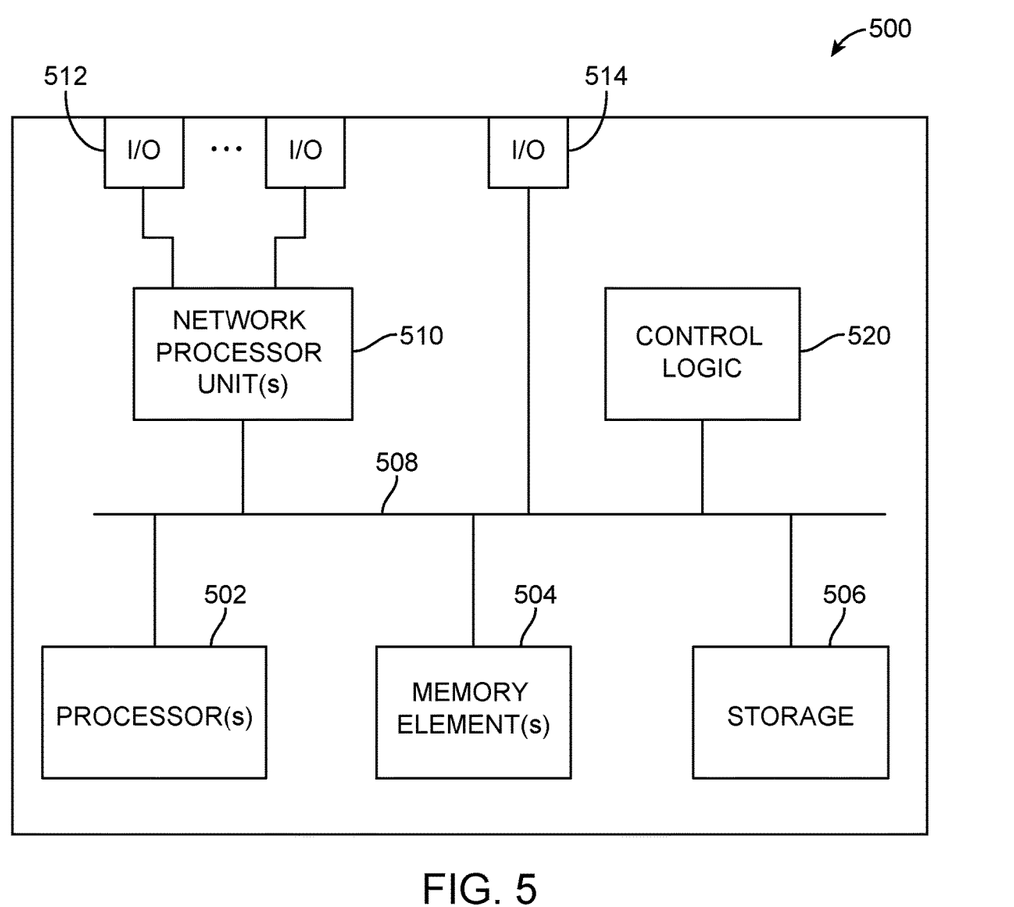
FIG. 5 is a block diagram of a computing device that may be configured to perform the techniques presented herein, according to an example embodiment.

Referring to FIG. 5, FIG. 5 illustrates a hardware block diagram of a computing/computer device 500 that may perform functions of a device associated with operations discussed herein in connection with the techniques depicted in FIGS. 1-4. In various embodiments, a computing device, such as computing device 500 or any combination of computing devices 500, may be configured as any devices as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, mouse, display, a touch screen display, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 500 serves as a user device as described herein.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to conduct operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc., as discussed for various embodiments described herein may be performed among entities that may directly or indirectly connected utilizing any algorithms, communication protocols, interfaces, etc., (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method performed by a computer-implemented user support bot, the method including: obtaining from a user a support request related to software and/or hardware used, or to be used, by the user; obtaining user lifecycle journey information that tracks deployment, adoption and/or use by the user of the software and/or hardware; determining a user intent for the support request based on the user lifecycle journey information when there is ambiguity as to the user intent based solely on the support request; and providing a response to the support request based on the user intent.

In some aspects, the techniques described herein relate to a method, further including: obtaining from the software and/or hardware, metadata identifying the software and/or hardware, state including network topology, software upgrade, configurations recently made, and/or alerts made by the software and/or hardware, wherein determining the user intent is further based on the metadata.

In some aspects, the techniques described herein relate to a method, wherein obtaining the metadata includes sending a command or application programming interface (API) request to the software and/or hardware to obtain, in response to the command or API request, information about a state of the software and/or hardware.

In some aspects, the techniques described herein relate to a method, wherein the user lifecycle journey information indicates a particular stage, of a plurality of stages, of a given software and/or hardware.

In some aspects, the techniques described herein relate to a method, wherein determining the user intent includes: selecting from a plurality of bot skill bundles, a particular bot skill bundle to answer the support request based on the particular stage of the given software and/or hardware.

In some aspects, the techniques described herein relate to a method, further including: based on the response, performing a configuration change on the software and/or hardware via a remote communication interaction from a support server.

In some aspects, the techniques described herein relate to a method, wherein the user support bot interprets the support request using text-based analysis.

In some aspects, the techniques described herein relate to a method, wherein the user lifecycle journey information includes information associated with user interactions via a user support portal, including any online training sessions performed by the user.

In some aspects, the techniques described herein relate to an apparatus including: a network interface that communicates with software and/or hardware used, or to be used by, a user; and at least one processor coupled to the network interface, the at least one processor executing one or more computer programs for a user support bot, and that perform operations including: obtaining from a user a support request related to software and/or hardware used, or to be used, by the user; obtaining user lifecycle journey information that tracks deployment, adoption and/or use by the user of the software and/or hardware; determining a user intent for the support request based on the user lifecycle journey information when there is ambiguity as to the user intent based solely on the support request; and providing a response to the support request based on the user intent.

In some aspects, the techniques described herein relate to an apparatus, wherein the at least one processor executes the one or more computer programs to further perform: obtaining from the software and/or hardware, metadata identifying the software and/or hardware, state including network topology, software upgrade, configurations recently made, and/or alerts made by the software and/or hardware, wherein determining the user intent is further based on the metadata.

In some aspects, the techniques described herein relate to one or more non-transitory computer readable media encoded with software instructions that, when executed by a processor of a support server that provides a computer-implemented user support bot, cause the support server to perform operations including: obtaining from a user a support request related to software and/or hardware used, or to be used, by the user; obtaining user lifecycle journey information that tracks deployment, adoption and/or use by the user of the software and/or hardware; determining a user intent for the support request based on the user lifecycle journey information when there is ambiguity as to the user intent based solely on the support request; and providing a response to the support request based on the user intent.

In some aspects, the techniques described herein relate to one or more non-transitory computer readable media, further including software instructions that, when executed by the processor of the support server, cause the support server to further perform: obtaining from the software and/or hardware, metadata identifying the software and/or hardware, state including network topology, software upgrade, configurations recently made, and/or alerts made by the software and/or hardware, wherein determining the user intent is further based on the metadata.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a computer-implemented user support bot, the method comprising:
    obtaining, from a user, a support request related to software and/or hardware used in an enterprise network, or to be used in the enterprise network, by the user;
    determining a user intent for the support request based on the support request;
    based on determining that an ambiguity is present with respect to the user intent,
        obtaining user lifecycle journey information including a particular stage of a plurality of stages that include a deployment stage of the software and/or hardware, an adoption stage of the software and/or hardware, and an in-use stage of the software and/or hardware, wherein the particular stage is a current stage for the hardware and/or the software in the enterprise network; and
        determining the user intent for the support request based on the support request and the particular stage for the hardware and/or the software; and
    providing a response to the support request based on the user intent.

2. The method of claim 1, further comprising:
    obtaining, from the software and/or hardware, metadata identifying a state of the software and/or hardware including network topology, software upgrade, configurations recently made, and/or alerts made by the software and/or hardware,
    wherein determining the user intent is further based on the metadata.

3. The method of claim 2, wherein obtaining the metadata includes sending a command or application programming interface (API) request to the software and/or hardware to obtain, in response to the command or API request, information about the state of the software and/or hardware.

4. The method of claim 1, wherein determining the user intent comprises:
selecting from a plurality of bot skill bundles, a particular bot skill bundle to answer the support request based on the particular stage of the software and/or hardware.

5. The method of claim 1, further comprising:
based on the response, performing a configuration change on the software and/or hardware via a remote communication interaction from a support server.

6. The method of claim 1, wherein the user support bot interprets the support request using text-based analysis.

7. The method of claim 1, wherein the user lifecycle journey information further includes information associated with user interactions via a user support portal, including any online training sessions performed by the user.

8. The method of claim 1, wherein the plurality of stages further include onboarding the software and/or hardware, implementing the software and/or hardware, and upgrading the software and/or hardware.

9. The method of claim 1, wherein determining that the ambiguity is present with respect to the support request is based on a plurality of bot skill bundles matching the support request and determining the user intent when the ambiguity is present comprises:
obtaining additional context from the user lifecycle journey information, the additional context including a state of deployment for the hardware and/or software within the enterprise network of the user and a state of the user within the enterprise network; and
selecting, from the plurality of bot skill bundles that include a training management skill bundle, a certificate skill bundle and a network management skill bundle, a particular bot skill bundle to answer the support request based on the particular stage of the software and/or hardware, based on the additional context.

10. The method of claim 1, wherein the plurality of stages further include an optimization stage in which performance of the hardware and/or software of the enterprise network is improved using optimization rules with parameters related to security and transport mechanisms.

11. An apparatus comprising:
a network interface that communicates with software and/or hardware used in an enterprise network, or to be used in the enterprise network by, a user; and
at least one processor coupled to the network interface, the at least one processor executing one or more computer programs for a user support bot, and that perform operations including:
obtaining, from the user, a support request related to the software and/or hardware used in the enterprise network, or to be used in the enterprise network, by the user;
determining a user intent for the support request based on the support request;
based on determining that an ambiguity is present with respect to the user intent,
obtaining user lifecycle journey information including a particular stage of a plurality of stages that include a deployment stage of the software and/or hardware, an adoption stage of the software and/or hardware, and an in-use stage of the software and/or hardware, wherein the particular stage is a current stage for the hardware and/or the software in the enterprise network, and;
determining the user intent for the support request based on the support request and the particular stage for the hardware and/or the software; and
providing a response to the support request based on the user intent.

12. The apparatus of claim 11, wherein the at least one processor executes the one or more computer programs to further perform:
obtaining from the software and/or hardware, metadata identifying a state the software and/or hardware including network topology, software upgrade, configurations recently made, and/or alerts made by the software and/or hardware,
wherein determining the user intent is further based on the metadata.

13. The apparatus of claim 12, wherein obtaining the metadata includes sending a command or application programming interface (API) request to the software and/or hardware to obtain, in response to the command or API request, information about the state of the software and/or hardware.

14. The apparatus of claim 11, wherein determining the user intent comprises:
selecting from a plurality of bot skill bundles, a particular bot skill bundle to answer the support request based on the particular stage of the software and/or hardware.

15. The apparatus of claim 11, wherein the at least one processor executes the one or more computer programs to further perform:
based on the response, providing a command that causes a configuration change on the software and/or hardware via a remote communication interaction.

16. The apparatus of claim 11, wherein the user support bot interprets the support request using text-based analysis.

17. The apparatus of claim 11, wherein the user lifecycle journey information further includes information associated with user interactions via a user support portal, including any online training sessions performed by the user.

18. One or more non-transitory computer readable media encoded with software instructions that, when executed by a processor of a support server that provides a computer-implemented user support bot, cause the support server to perform operations including:
obtaining from a user a support request related to software and/or hardware used in an enterprise network, or to be used in the enterprise network, by the user;
determining a user intent for the support request based on the support request;
based on determining that an ambiguity is present with respect to the user intent,
obtaining user lifecycle journey information including a particular stage of a plurality of stages that include a deployment stage of the software and/or hardware, an adoption stage of the software and/or hardware, and an in-use stage of the software and/or hardware, wherein the particular stage is a current stage of the hardware and/or the software in the enterprise network, and
determining the user intent for the support request based on the support request and the particular stage for the hardware and/or the software; and
providing a response to the support request based on the user intent.

19. The one or more non-transitory computer readable media of claim 18, further comprising software instructions that, when executed by the processor of the support server, cause the support server to further perform:

obtaining from the software and/or hardware, metadata identifying a state of the software and/or hardware including network topology, software upgrade, configurations recently made, and/or alerts made by the software and/or hardware, wherein determining the user intent is further based on the metadata.

20. The one or more non-transitory computer readable media of claim 18, wherein determining the user intent comprises:

selecting from a plurality of bot skill bundles, a particular bot skill bundle to answer the support request based on the particular stage of the software and/or hardware.

* * * * *

UNITED STATES PATENT AND TRADEMARK OFFICE
CERTIFICATE OF CORRECTION

PATENT NO. : 12,184,516 B2  
APPLICATION NO. : 17/869085  
DATED : December 31, 2024  
INVENTOR(S) : Chidambaram Arunachalam et al.

Page 1 of 1

It is certified that error appears in the above-identified patent and that said Letters Patent is hereby corrected as shown below:

In the Claims

Claim 1, Column 14, Lines 51-52, please replace "enterprise network; and" with --enterprise network, and--

Claim 11, Column 16, Line 2, please replace "enterprise network, and;" with --enterprise network, and--

Signed and Sealed this  
Fourth Day of February, 2025

Coke Morgan Stewart  
*Acting Director of the United States Patent and Trademark Office*